E. S. JOHNSON.
HOG OILER.
APPLICATION FILED MAY 13, 1918.

1,290,753.

Patented Jan. 7, 1919.

INVENTOR.
E. S. Johnson,
BY G. C. Kennedy.
ATTORNEY.

UNITED STATES PATENT OFFICE.

ERNEST S. JOHNSON, OF WEBSTER CITY, IOWA.

HOG-OILER.

1,290,753.   Specification of Letters Patent.   Patented Jan. 7, 1919.

Application filed May 13, 1918. Serial No. 234,113.

*To all whom it may concern:*

Be it known that I, ERNEST S. JOHNSON, a citizen of the United States of America, and a resident of Webster City, Hamilton county, Iowa, have invented certain new and useful Improvements in Hog-Oilers, of which the following is a specification.

My invention relates to improvements in hog oilers, and the object of my improvement is to supply a rotatable oil applicator which is positioned suitably to be most convenient for use by an animal, and so as to prevent fouling of the contents of the oil receptacle.

Figure 1:
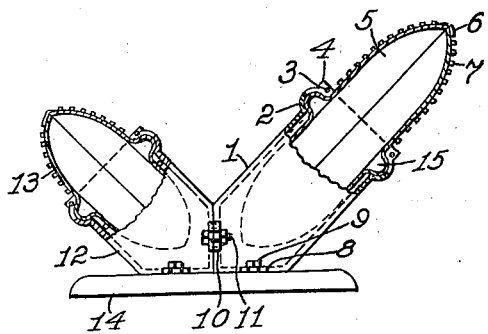
Figure 2:
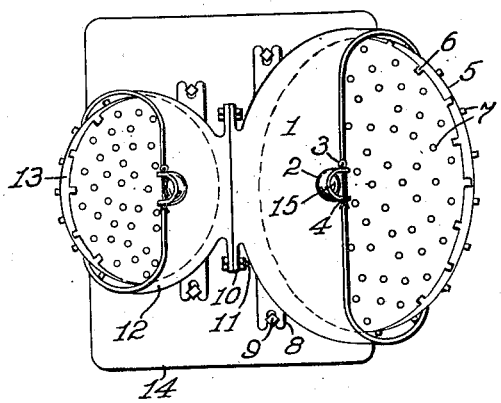

This object I have accomplished by the means which are hereinafter described and claimed, and which are illustrated in the accompanying drawings, in which Figure 1 is an elevation, with parts broken away, of two of my improved hog oilers fastened together, and Fig. 2 is a top plan view of the same.

Similar numerals of reference denote corresponding parts throughout the several views.

My improved hog oiler may be used in single or in associated units, and Figs. 1 and 2 illustrate two such units fastened detachably together, the two units being of different dimensions. The right-hand oil receptacle 1 is larger than the other receptacle 12, but may be of the same or a smaller size. Each unit comprises an open-topped oil-receptacle, such as 1 and 12, with wedge-shaped lower end, the receptacle being set obliquely to the vertical to rest on one of the faces of its wedge-shaped end. Each receptacle has on opposite ends two pairs of integral forks to receive bolts securing them to supporting-means such as a base 14. On each end is a fork 8 to receive a bolt 9 to secure it to said base, while another fork 10 extends from the receptacle in a position angularly to the other fork, whereby a bolt 11 may be used to secure said receptacle to an upright support, such as a post or a building, or to another unit receptacle as shown.

When a pair of said receptacles 1 and 12 are thus secured together and to a common base 14, they diverge from each other in V-shape, permitting a hog to step between them easily.

Each receptacle has oppositely positioned bearing-sockets 2 at the middles of its longitudinal edges, said sockets being half cut away to permit of the ready reception or withdrawal of boss-like pintles formed from central parts of the opposite walls of a hollow rotatable oblate oil-distributer or applicator 5. When said pintles 15 are seated in the sockets or bearings 2, they are retained therein from displacement by split-keys 3 passed through holes in oppositely placed extensions 4 of the socket-walls.

Each applicator 5 is preferably formed in halves placed with edges in registration, made of pressed metal, whereby projections 6 may be provided along the circumferential edges of each half which may be bent or clenched over upon the adjacent exterior surface of one other half, to thus tie the halves together.

The outer surfaces of these applicators 5 and 13 may have distributed thereover numerous rugations of any desired kind or number, but I have shown small knobs 7 so used as a preferable form.

Since nearly a half of each applicator projects from the open mouth of its receptacle, that amount of surface is available for the animal to rub against, thus rotating the applicator which covers it with oil and applies it to the animal. The inclined position of the applicator facilities approach by the animal and permits it to easily rub its sides and back thereagainst, which action would not be as effectual with a vertically extending applicator. Also, in the event that the animal is bedaubed with mud, the inclined position of the applicator permits the detached mud after rubbing to fall clear of the mouth of said oil receptacle, which prevents fouling it as so often the case with other applicators which extend vertically from the receptacle.

The pair of devices 5 and 13 being of different dimensions, permits their effective use by animals of different sizes, when so combined or assembled, and the V-shape of the conjoined units permits the animal to step across between them, or get access to either to rub certain parts, in a convenient manner.

Having described my invention, what I claim as new, and desire to secure by Letters Patent, is:

1. In a hog-oiler, an open-end receptacle tilted at less than a right angle to the vertical, and an oblate body removably rotatably mounted therein to extend therefrom outwardly at the same angle to the vertical as the receptacle.

2. In a hog-oiler, an open-end receptacle tilted at less than a right angle to the vertical and having segmental bearing bosses containing bearing-sockets, and an oblate applicator having outwardly-extending boss-like pintles positioned removably in said bearing-sockets, said applicator overhanging one side of said receptacle.

3. In a hog-oiler, conjoined open-end receptacles, connected to diverge upwardly in V-shape, and applicators mounted rotatably in each to project outwardly obliquely therefrom and overhang the outer wall of each.

4. In a hog-oiler, conjoined open-end receptacles connected to diverge upwardly obliquely in V-shape, and oblate applicators rotatably and removably mounted in said receptacles to project therefrom obliquely and overhang the outer walls of the receptacles, said applicators being of different diameters.

Signed at Waterloo, Iowa, this 27th day of April, 1918.

ERNEST S. JOHNSON.

Copies of this patent may be obtained for five cents each, by addressing the "Commissioner of Patents, Washington, D. C."